(12) United States Patent
Ou et al.

(10) Patent No.: US 8,773,362 B2
(45) Date of Patent: Jul. 8, 2014

(54) ELECTRONIC APPARATUS AND INPUT INTERFACE THEREOF

(75) Inventors: Tsung-Yuan Ou, Taoyuan County (TW); Hsing-Chiang Huang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1103 days.

(21) Appl. No.: 12/337,645

(22) Filed: Dec. 18, 2008

(65) Prior Publication Data

US 2009/0160680 A1 Jun. 25, 2009

Related U.S. Application Data

(60) Provisional application No. 61/015,671, filed on Dec. 21, 2007.

(51) Int. Cl.
*G06F 3/041* (2006.01)

(52) U.S. Cl.
USPC .......................................................... 345/173

(58) Field of Classification Search
CPC ....................................................... G06F 3/041
USPC .................. 360/173, 174; 341/15; 340/815.4; 200/600
See application file for complete search history.

(56) References Cited

U.S. PATENT DOCUMENTS

| 4,158,216 | A | * | 6/1979 | Bigelow .......................... 200/600 |
|---|---|---|---|---|
| 4,233,593 | A | * | 11/1980 | Bigelow ............................ 341/15 |
| 5,659,297 | A | * | 8/1997 | Tatavoosian ............... 340/815.4 |
| 7,215,319 | B2 | | 5/2007 | Kamijo |
| 7,253,643 | B1 | | 8/2007 | Seguine |
| 7,348,967 | B2 | | 3/2008 | Zadesky |
| 7,499,040 | B2 | | 3/2009 | Zadesky |
| 2003/0063073 | A1 | | 4/2003 | Geaghan et al. |
| 2004/0252109 | A1 | | 12/2004 | Trent, Jr. |
| 2005/0104867 | A1 | | 5/2005 | Westerman |
| 2006/0048073 | A1 | | 3/2006 | Jarrett |

(Continued)

FOREIGN PATENT DOCUMENTS

| CN | 1596412 A | 3/2005 |
|---|---|---|
| KR | 100781706 B1 | 12/2007 |

(Continued)

OTHER PUBLICATIONS

Office action mailed on Oct. 4, 2011 for the U.S. Appl. No. 12/329,623, filing date Dec. 7, 2008, p. 1-18.

(Continued)

*Primary Examiner* — Fred Tzeng
(74) *Attorney, Agent, or Firm* — Winston Hsu; Scott Margo

(57) ABSTRACT

An electronic apparatus includes an input interface, a controller and a processor. The input interface includes a central touch sensing region and a peripheral touch sensing region. The central touch sensing region has a central touch pad disposed therein, and the peripheral sensing region surrounds the central touch sensing region and includes a plurality of peripheral touch pads disposed therein. The controller is configured for detecting a touch on the central touch pad and at least one of the peripheral touch pads and generating a central detecting signal and at least one peripheral detecting signal. The processor is electrically coupled to the controller. When receiving the central detecting signal and the at least one peripheral detecting signal, the processor performs a corresponding function according to the variation of signal strengths of the central detecting signal and the peripheral detecting signal.

6 Claims, 7 Drawing Sheets

(56) References Cited

U.S. PATENT DOCUMENTS

| | | |
|---|---|---|
| 2006/0250372 A1 | 11/2006 | Lii |
| 2007/0013674 A1 | 1/2007 | Woolley |
| 2007/0109280 A1 | 5/2007 | Sigona |
| 2007/0242057 A1* | 10/2007 | Zadesky et al. ............... 345/173 |
| 2007/0273671 A1 | 11/2007 | Zadesky |
| 2007/0276525 A1* | 11/2007 | Zadesky et al. ................. 700/94 |
| 2007/0283263 A1 | 12/2007 | Zawde |
| 2007/0291016 A1* | 12/2007 | Philipp ........................ 345/174 |
| 2008/0012837 A1* | 1/2008 | Marriott et al. ............... 345/173 |
| 2008/0018615 A1* | 1/2008 | Zadesky et al. ............... 345/173 |
| 2008/0084397 A1 | 4/2008 | On |
| 2008/0088600 A1* | 4/2008 | Prest et al. .................... 345/173 |
| 2008/0284742 A1* | 11/2008 | Prest et al. .................... 345/173 |
| 2009/0083659 A1 | 3/2009 | Tatehata |
| 2009/0153518 A1 | 6/2009 | Paczkowski |

FOREIGN PATENT DOCUMENTS

| | | |
|---|---|---|
| TW | I262427 | 9/2006 |
| TW | 200639681 | 11/2006 |
| TW | 200739391 | 10/2007 |

OTHER PUBLICATIONS

Office action mailed on Apr. 9, 2012 for the Taiwan application No. 097143514, filing date Nov. 11, 2008, p. 1-12.

Office action mailed on Apr. 9, 2012 for the Taiwan application No. 097143513, filing date Nov. 11, 2008, p. 1-10.

Office Action mailed on Jul. 25, 2012 for Taiwan application No. 097137454, filing date Sep. 30, 2008, p. 1-6.

Office action mailed on Feb. 9, 2012 for the Taiwan application No. 097133200, filing date Aug. 29, 2008, p. 1-8.

Office action mailed on Dec. 8, 2011 for the U.S. Appl. No. 12/339,100, filing date Dec. 19, 2008, p. 1-18.

* cited by examiner

ELECTRONIC APPARATUS AND INPUT INTERFACE THEREOF

CROSS REFERENCE TO RELATED APPLICATIONS

This application claims the benefit of U.S. provisional application No. 61/015,671, which was filed on Dec. 21, 2007.

BACKGROUND OF THE INVENTION

1. Field of the Invention

The present invention relates to an electronic apparatus, and more particularly, to an electronic apparatus having a central touch sensing region and a peripheral touch sensing region.

2. Description of the Prior Art

In general, most mobile phones utilize direction keys of a navigator key to operate a mobile phone, e.g. entering a menu or move the pointer on the screen. The direction keys of the navigator key in a certain mode (usually a standby mode) also serve as function keys. For example, the phone book stored in the mobile phone is directly shown on the screen when one of the direction keys is pressed, and the calendar stored in the mobile phone is directly shown on the screen when another direction key is pressed. In fact, the function that each of the direction keys corresponds to can be set by the user or the manufacturer of the mobile phone.

SUMMARY OF THE INVENTION

The present invention provides an electronic apparatus comprising an input interface, a controller and a processor. The input interface comprises a central touch sensing region and a peripheral touch sensing region. The central touch sensing region has a central touch pad disposed therein. The peripheral touch sensing region surrounds the central touch sensing region and has a plurality of peripheral touch pads disposed therein. The plurality of peripheral touch pads are arranged in a radial array and separated from the central touch pad by a distance. The controller is electrically coupled to the central touch pad in the central touch sensing region and each peripheral touch pad in the peripheral touch sensing region, and is configured for detecting an touch on the central touch pad and generating a central sensing signal according to the touch on the central touch pad and for detecting the touch on at least one of the plurality of peripheral touch pads and generating at least one peripheral sensing signal according to the touch on the at least one of the plurality of peripheral touch pads. The processor is electrically coupled to the controller, and is configured for receiving the central sensing signal and the at least one peripheral sensing signal. When the processor receives the central sensing signal and the at least one peripheral sensing signal, it executes a corresponding function according to the signal strength of the received central sensing signal and the signal strength of the received peripheral sensing signal.

According to one exemplary embodiment of the present invention, an input interface is disclosed. The input interface comprises a central touch sensing region and a peripheral touch sensing region. The central touch sensing region has a central touch pad disposed therein. The peripheral touch sensing region surrounds the central touch sensing region and has a plurality of peripheral touch pads. The plurality of peripheral touch pads are arranged in a radial array and separated from the central touch pad by a distance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
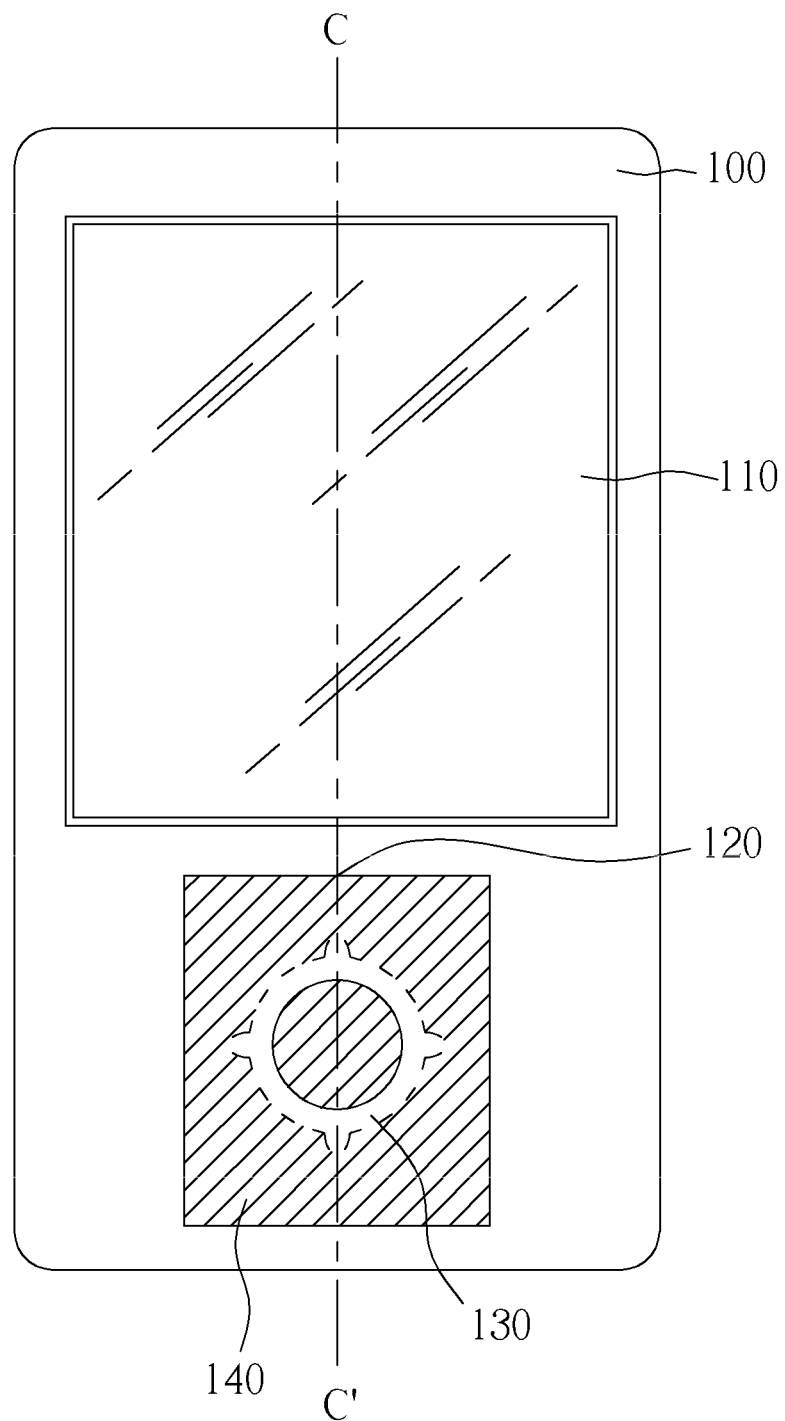
FIG. 1 is a schematic diagram illustrating an electronic apparatus according to an embodiment of the present invention.
Figure 2:
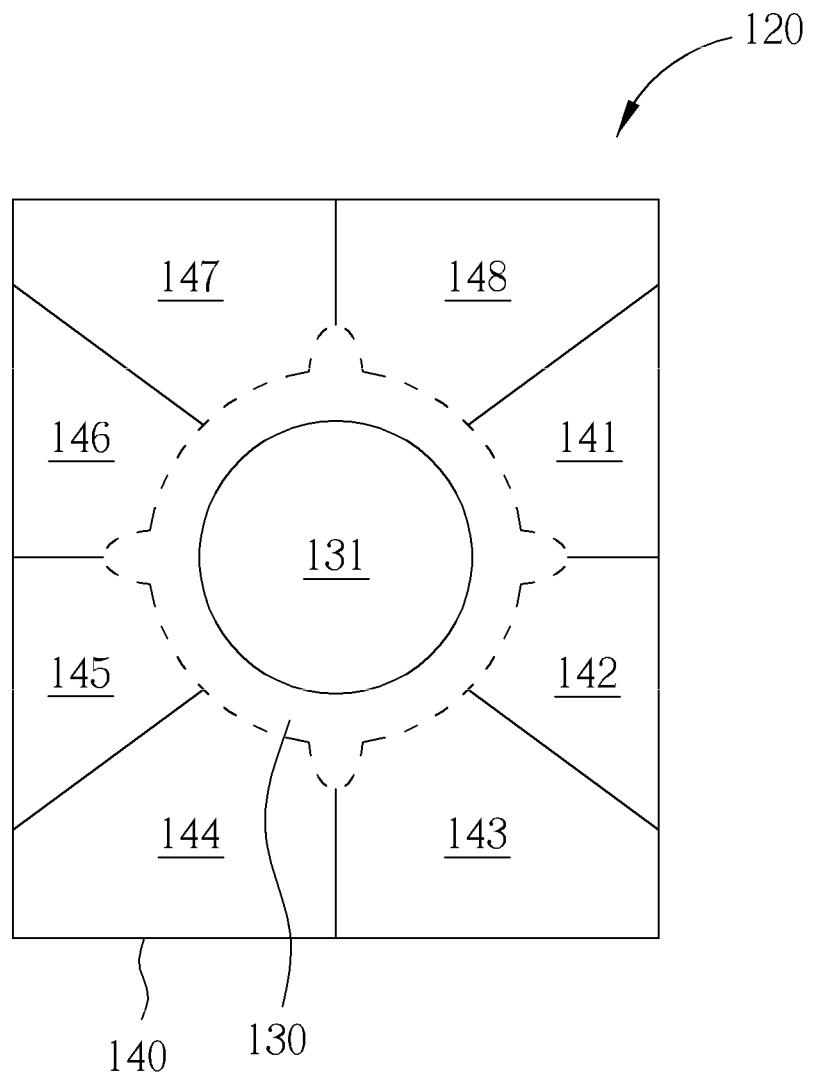
FIG. 2 is a diagram illustrating the input interface shown in FIG. 1.
Figure 3:
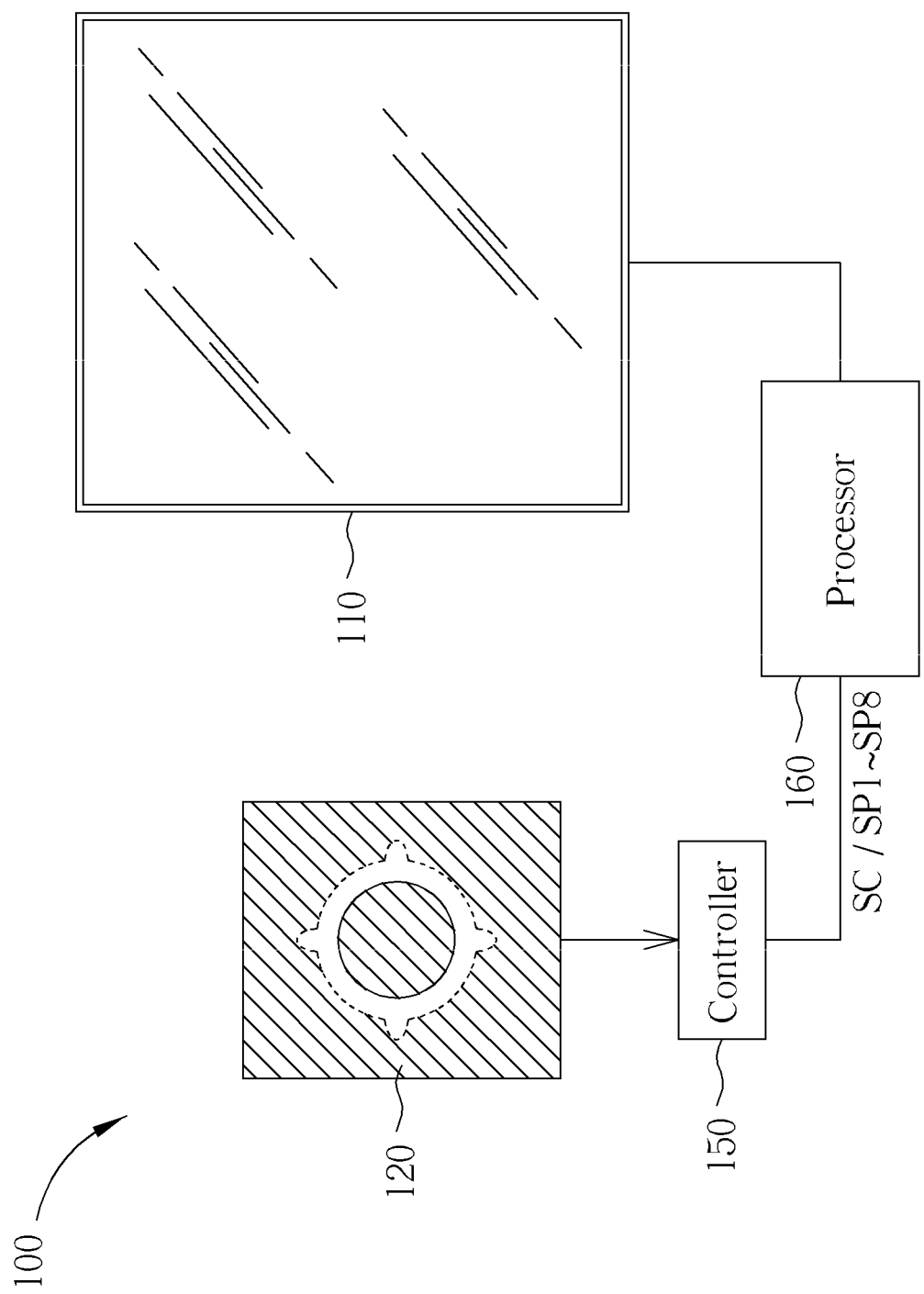
FIG. 3 is a block diagram illustrating the electronic apparatus shown in FIG. 1.

Please refer to FIG. 1. FIG. 1 is a schematic diagram illustrating an electronic apparatus 100 according to an embodiment of the present invention. As shown in FIG. 1, the electronic apparatus 100 comprises a display 110 and an input interface 120, which are both disposed on a front surface of the electronic apparatus 100. The input interface 120 is disposed adjacent to the display 110 and comprises a central touch sensing region 130 and a peripheral touch sensing region 140 which surrounds the central touch sensing region 130. Please refer to FIG. 2. FIG. 2 is a diagram illustrating the input interface 120 shown in FIG. 1. As shown in FIG. 2, the central touch sensing region 130 has a central touch pad 131 disposed therein and the peripheral touch sensing region 140 has a plurality of peripheral touch pads 141, 142, 143, 144, 145, 146, 147, 148 disposed therein. The plurality of peripheral touch pads 141, 142, 143, 144, 145, 146, 147, 148 are arranged in a radial array and separated from the central touch pad 131 by a distance. Additionally, each of the touch pads in the input interface 120 is a capacitive touch pad. Please refer to FIG. 3. FIG. 3 is a block diagram illustrating the electronic apparatus 100 shown in FIG. 1. As shown in FIG. 3, the electronic apparatus 100 further comprises a controller 150 and a processor 160. The controllers 50 is electrically coupled to each of the touch pads in the input interface 120 (not shown in FIG. 3). More specifically, the controller 150 is electrically coupled to the central touch pad 131 (touch pad 131 is illustrated in FIG. 2) in the central touch sensing region 130, and is configured for detecting an touch on the central touch pad 131 and generating a central sensing signal SC according to the touch. The controller 150 is also electrically coupled to the plurality of peripheral touch pads 141-148 in the peripheral touch sensing region 140 (touch pads 141-148 are illustrated in FIG. 2), and is configured for detecting the touch on the plurality of peripheral touch pads 141-148 and generating a plurality of peripheral sensing signals SP1-SP8 according to the touch. The processor 160 is electrically coupled to the controller 150 and the display 110. When the processor 160 receives the central sensing signal SC and at least one of the peripheral sensing signals SP1-SP8, it executes a corresponding function, e.g. controlling the information or panning an image displayed on the display 110, according to the signal strength of the received central sensing signal SC and the signal strength of the at least one of the received peripheral sensing signals SP1-SP8.

Further description of the electronic apparatus 100 is detailed as follows. In this embodiment, the electronic apparatus 100 is a personal digital assistance (PDA); however, this is merely for illustrative purposes and is not a limitation of the present invention. In other embodiments of the present invention, the electronic apparatus may be a handheld communication apparatus (e.g., a mobile phone or a global navigation satellite system (GNSS)) or a handheld calculating apparatus (e.g., a multimedia player).

Figure 4:
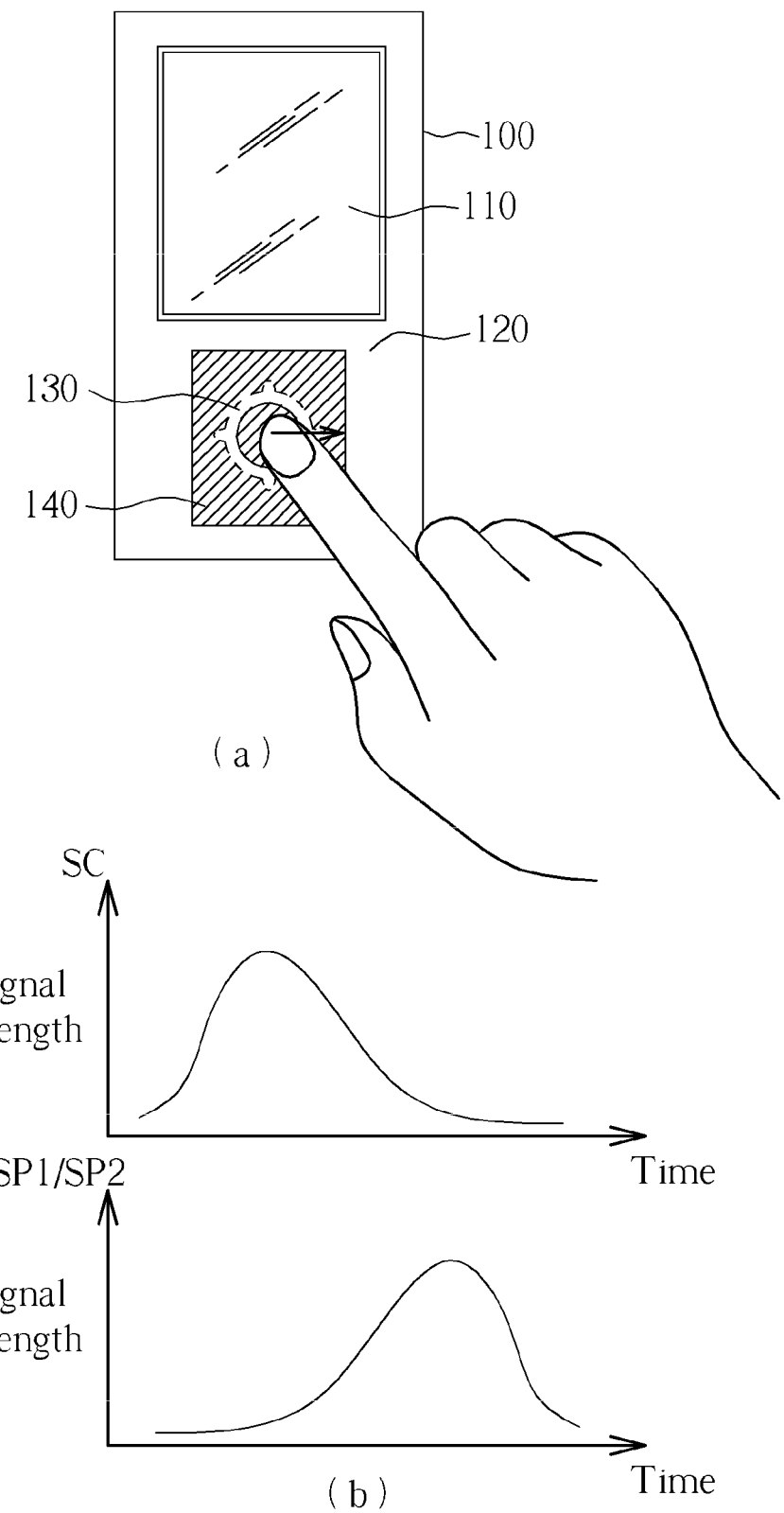
FIG. 4(a) is a diagram illustrating a user moving his/her finger on the input interface rightwards from the central sensing region.
FIG. 4(b) is a diagram illustrating the signal strength change of the sensing signal with time corresponding to the FIG. 4(a).

Please refer to FIG. 4. Taking FIG. 4(a) for example, under a situation that the electronic apparatus 100 is in a standby state, when a user moves an object (e.g., a finger or a touch pen) on the input interface 120 rightwards from the central touch pad 131 (illustrated in FIG. 2) in the central touch sensing region 130 to the peripheral touch pads 141, 142 (illustrated in FIG. 2) in the peripheral touch sensing region 140, the controller 150 generates the central sensing signal SC and the peripheral sensing signals SP1, SP2 when detecting the touch of the object on the touch pads 131, 141, 142 respectively. Please refer to FIG. 4(b), which is a diagram illustrating the changes of the signal strength of the central sensing signal SC and the peripheral sensing signals SP1, SP2 with time. As shown in FIG. 4(b), while the user is moving his or her finger rightwards from the central touch sensing region 130 to the peripheral touch sensing region 140, the signal strength of the central sensing signal SC will be decreased with time and that of the peripheral sensing signals SP1, SP2 will be increased with time. Accordingly, when the processor 160 receives the central sensing signal SC and the peripheral sensing signals SP1, SP2 from the controller 150, it is able to determine that the input interface 120 receives a rightward object touch according to the changes of the signal strength of the central sensing signal SC and the peripheral sensing signals SP1, SP2, and accordingly executes a function, e.g. showing a contact list or panning an image rightwards on the display 110, according to the rightward object touch.

Figure 5:
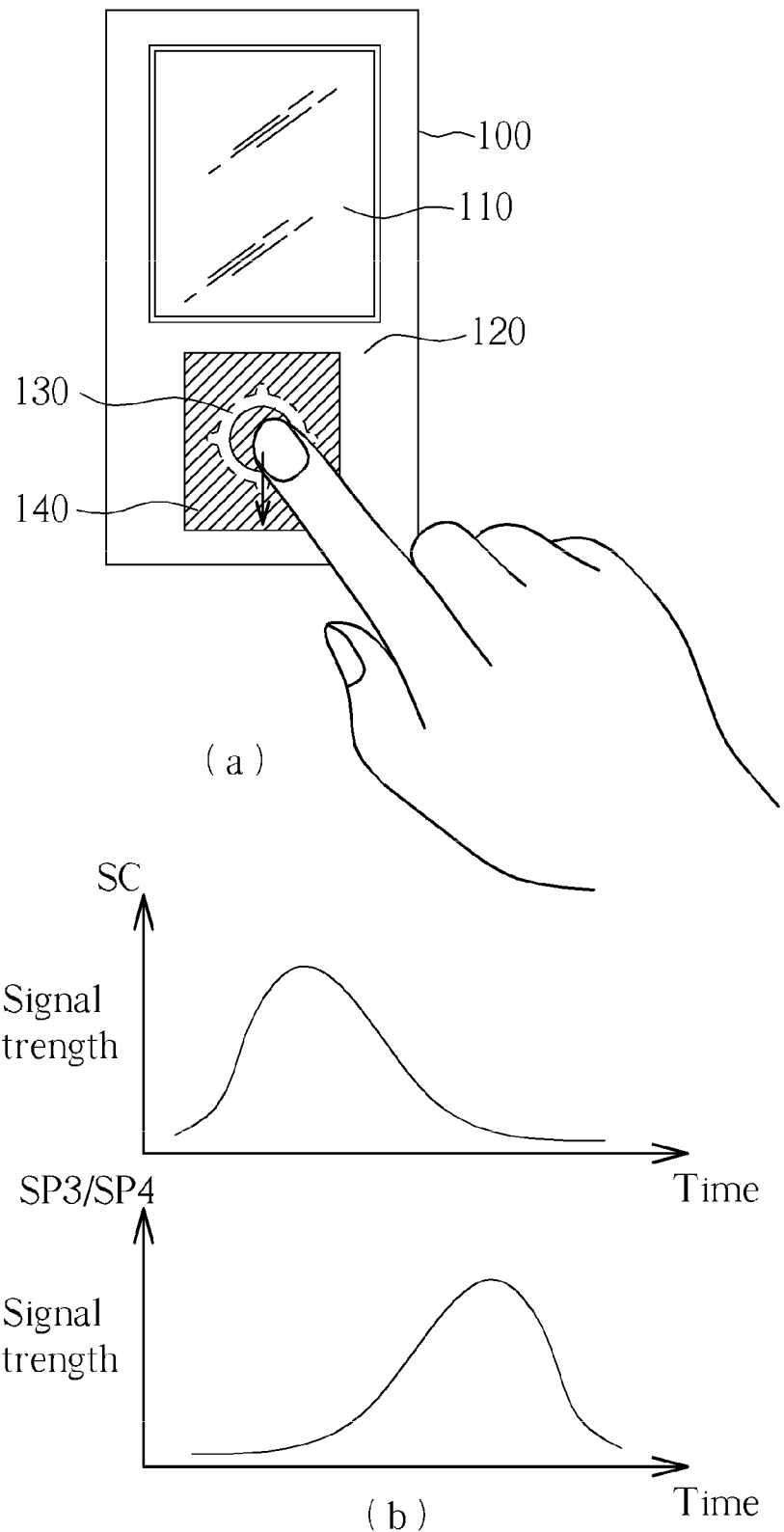
FIG. 5(a) is a diagram illustrating a user moving his/her finger on the input interface downwards from the central sensing region.
FIG. 5(b) is a diagram illustrating the signal strength change of the sensing signal with time corresponding to the FIG. 5(a).

Similarly, please refer to FIG. 5. Taking FIG. 5(a) for example, under a situation that the electronic apparatus 100 is in a standby state, when a user moves an object (e.g., a finger or a touch pen) on the input interface 120 downwards from the central touch pad 131 (illustrated in FIG. 2) in the central touch sensing region 130 to the peripheral touch pads 143, 144 (illustrated in FIG. 2) in the peripheral touch sensing region 140, the controller 150 generates the central sensing signal SC and the peripheral sensing signals SP3, SP4 when detecting the touch of the object on the touch pads 131, 143, 144 respectively. Please refer to FIG. 5(b), which is a diagram illustrating the changes of the signal strength of the central sensing signal SC and the peripheral sensing signals SP3, SP4 with time. As shown in FIG. 5(b), while the user is moving his or her finger downwards from the central touch sensing region 130 to the peripheral touch sensing region 140, the signal strength of the central sensing signal SC will be decreased with time and that of the peripheral sensing signals SP3, SP4 will be increased with time. Accordingly, when the processor 160 receives the central sensing signal SC and the peripheral sensing signals SP3, SP4 from the controller 150, it is able to determine that the input interface 120 receives a downward object touch according to the changes of the signal strength of the central sensing signal SC and the peripheral sensing signals SP3, SP4, and accordingly executes a function, e.g. showing a calendar or panning an image downwards on the display 110, according to the downward object touch.

Figure 6:
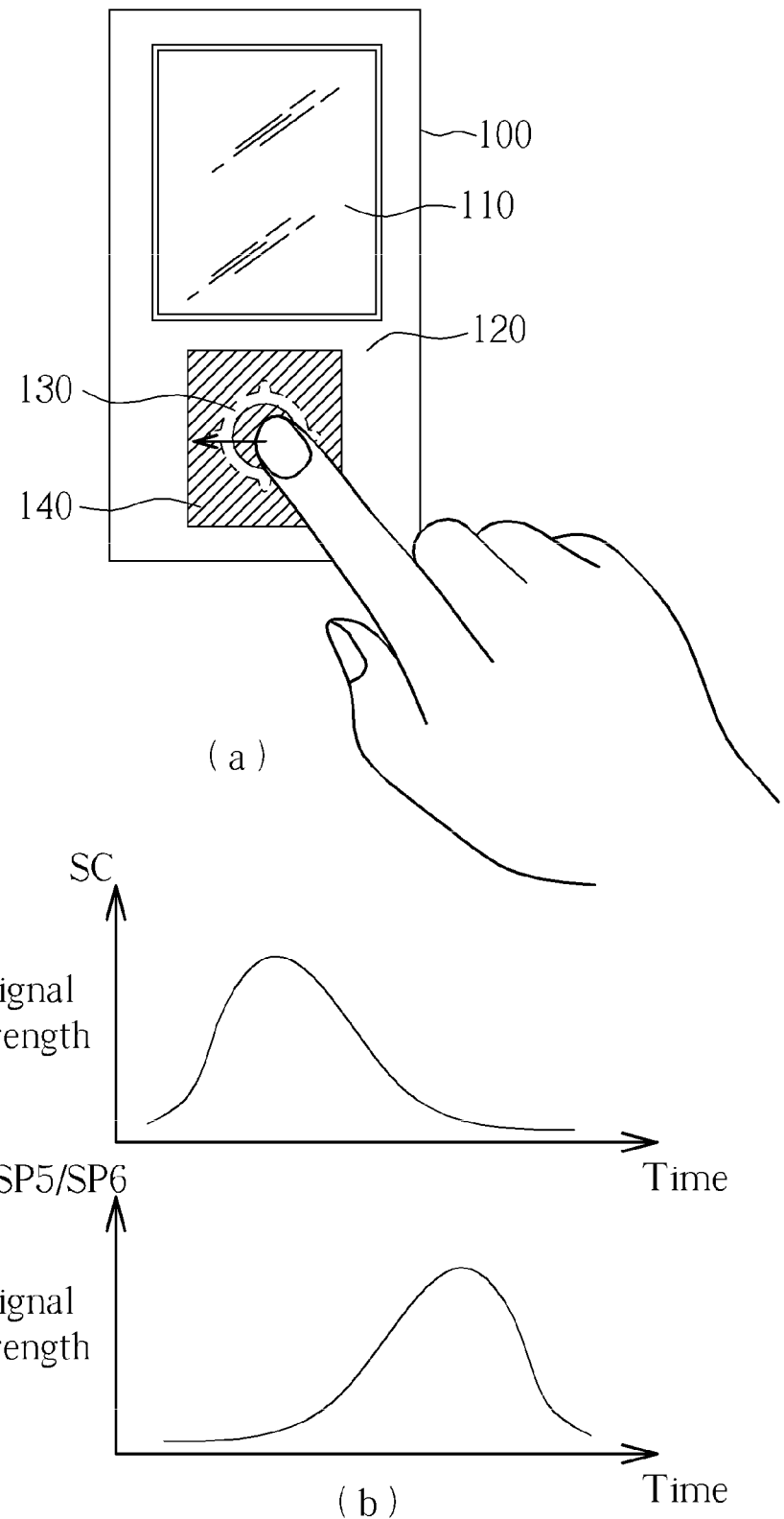
FIG. 6(a) is a diagram illustrating a user moving his/her finger on the input interface leftwards from the central sensing region.
FIG. 6(b) is a diagram illustrating the signal strength change of the sensing signal with time corresponding to the FIG. 6(a).

Similarly, please refer to FIG. 6. Taking FIG. 6(a) for example, under a situation that the electronic apparatus 100 is in a standby state, when a user moves an object (e.g., a finger or a touch pen) on the input interface 120 leftwards from the central touch pad 131 (illustrated in FIG. 2) in the central touch sensing region 130 to the peripheral touch pads 145, 146 (illustrated in FIG. 2) in the peripheral touch sensing region 140, the controller 150 generates the central sensing signal SC and the peripheral sensing signals SP5, SP6 when detecting the touch of the object on the touch pads 131, 145, 146 respectively. Please refer to FIG. 6(b), which is a diagram illustrating the changes of the signal strength of the central sensing signal SC and the peripheral sensing signals SP5, SP6 with time. As shown in FIG. 6(b), while the user is moving his or her finger leftwards from the central touch sensing region 130 to the peripheral touch sensing region 140, the signal strength of the central sensing signal SC will be decreased with time and that of the peripheral sensing signals SP5, SP6 will be increased with time. Accordingly, when the processor 160 receives the central sensing signal SC and the peripheral sensing signals SP5, SP6 from the controller 150, it is able to determine that the input interface 120 receives a leftward object touch according to the changes of the signal strength of the central sensing signal SC and the peripheral sensing signals SP5, SP6, and accordingly executes a function, e.g. creating a new message or panning an image leftwards on the display 110, according to the leftward object touch.

Figure 7:
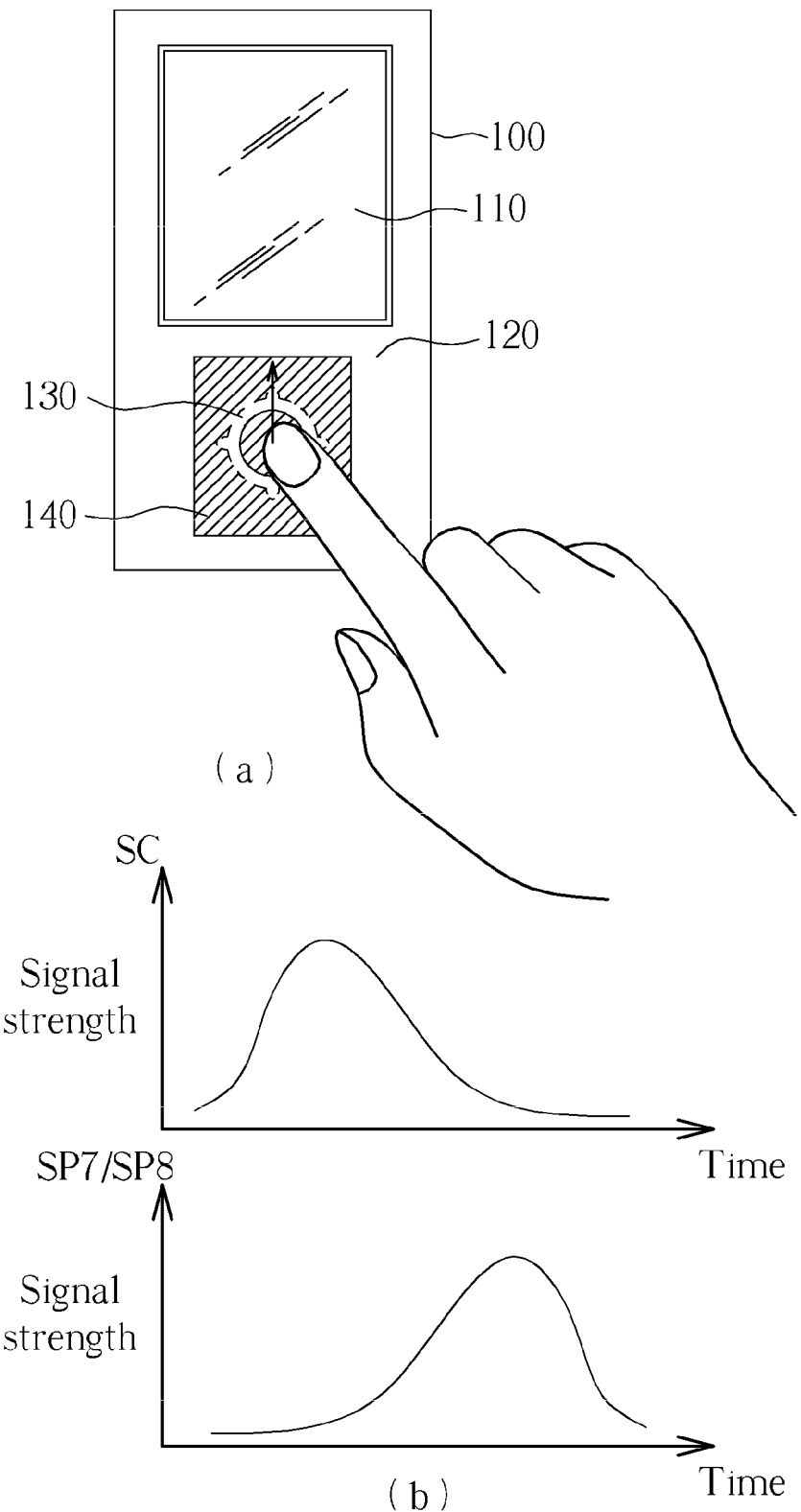
FIG. 7(a) is a diagram illustrating a user moving his/her finger on the input interface upwards from the central sensing region.
FIG. 7(b) is a diagram illustrating the signal strength change of the sensing signal with time corresponding to the FIG. 7(a).

Similarly, please refer to FIG. 7. Taking FIG. 7(a) for example, under a situation that the electronic apparatus 100 is in a standby state, when a user moves an object (e.g., a finger or a touch pen) on the input interface 120 upwards from the central touch pad 131 (illustrated in FIG. 2) in the central touch sensing region 130 to the peripheral touch pads 147, 148 (illustrated in FIG. 2) in the peripheral touch sensing region 140, the controller 150 generates the central sensing signal SC and the peripheral sensing signals SP7, SP8 when detecting the touch of the object on the touch pads 131, 147, 148 respectively. Please refer to FIG. 7(b), which is a diagram illustrating the changes of the signal strength of the central sensing signal SC and the peripheral sensing signals SP7, SP8 with time. As shown in FIG. 7(b), while the user is moving his or her finger upwards from the central touch sensing region 130 to the peripheral touch sensing region 140, the signal strength of the central sensing signal SC will be decreased with time and that of the peripheral sensing signals SP7, SP8 will be increased with time. Accordingly, when the processor 160 receives the central sensing signal SC and the peripheral sensing signals SP7, SP8 from the controller 150, it is able to determine that the input interface 120 receives an upward object touch according to the changes of the signal strength of the central sensing signal SC and the peripheral sensing signals SP7, SP8, and accordingly executes a function, e.g. showing a missed call list or panning a figure upwards on the display 110, according to the upward object touch.

As can be seen from the above description, when a user moves an object (e.g., a finger or a touch pen) on the input interface 120 from the central touch sensing region 130 to at least one of the peripheral touch pads 141-148, the processor 160 of the electronic apparatus 100 will execute a function correspondingly. In addition, for the input interface 120 of the electronic apparatus 100, the surface of the peripheral touch sensing region 140 is a flat surface and the surface of the central touch sensing region 130 is a concave surface concaved adjacent to the flat surface, in order to help the user to recognize where the central touch sensing region 130 is in the input interface 120. Moreover, please refer to FIG. 1, a central line C-C' of the display 110 goes through the central touch sensing region 130 to make the user easily control the electronic apparatus 100 with a thumb while holding the electronic apparatus 100.

Please note that the touch pads of the input interface 120 (i.e., 131, 141-148) are all capacitive touch pads in the above embodiment; however, this is only for illustrative purposes and is not a limitation of the present invention. In other embodiments of the present invention, the touch pads of the input interface 120 can be any combination of the capacitive touch pad, inductive touch pad and the resistive touch pad, and this alternative design also falls within the scope of the present invention.

Those skilled in the art will readily observe that numerous modifications and alterations of the device and method may be made while retaining the teachings of the invention. accordingly, the above disclosure should be construed as limited only by the metes and bounds of the appended claims.

What is claimed is:

1. An electronic apparatus, comprising:
an input interface, comprising:
a central touch sensing region having a central touch pad disposed therein, wherein the central touch pad is a capacitive touch pad; and
a peripheral touch sensing region surrounding the central touch sensing region and having a plurality of peripheral touch pads disposed therein, wherein the plurality of peripheral touch pads are arranged in a radial array and separated from the central touch pad by a distance, wherein the peripheral touch pads are all capacitive touch pads;
a controller, electrically coupled to the central touch pad in the central touch sensing region and each peripheral touch pad in the peripheral touch sensing region, for detecting an touch on the central touch pad and generating a central sensing signal according to the touch on the central touch pad, and for detecting the touch on at least one of the plurality of peripheral touch pads and generating at least one peripheral sensing signal according to the touch on the at least one of the plurality of peripheral touch pads; and
a processor, electrically coupled to the controller, for receiving the central sensing signal and the at least one peripheral sensing signal, wherein when the processor receives the central sensing signal and the at least one peripheral sensing signal, the processor executes a corresponding function according to the signal strength of the received central sensing signal and the signal strength of the received peripheral sensing signal;
wherein when the processor determines that the signal strength of the received central sensing signal is decreased and the signal strength of the received peripheral sensing signal is increased, the processor executes the corresponding function.

2. The electronic apparatus of claim 1, which is a hand-held electronic apparatus and further comprises:
a display, disposed on a front surface of the electronic apparatus, for displaying information, wherein the input interface is disposed adjacent to the display, and the central touch sensing region is disposed with a central line of the display goes therethrough.

3. The electronic apparatus of claim 2, wherein the corresponding function is panning an image on the display.

4. The electronic apparatus of claim 2, wherein the peripheral touch sensing region has a flat surface, and the central touch sensing region has a concave surface concaved adjacent to the flat surface.

5. An input interface for an electronic apparatus, comprising:
a central touch sensing region having a central touch pad disposed therein, wherein the central touch pad is a capacitive touch pad; and
a peripheral touch sensing region surrounding the central touch sensing region and having a plurality of peripheral touch pads disposed therein, wherein the plurality of peripheral touch pads are arranged in a radial array and separated from the central touch pad by a distance, wherein the peripheral touch pads are all capacitive touch pads;
wherein when the signal strength of a received central sensing signal generated from the central touch pad is decreased and the signal strength of a received peripheral sensing signal generated from the peripheral touch sensing region is increased, a corresponding function is executed.

6. The input interface of claim 5, wherein the peripheral touch sensing region has a flat surface, and the central touch sensing region has a concave surface concaved adjacent to the flat surface.

* * * * *